United States Patent
Fu et al.

(10) Patent No.: US 10,960,803 B2
(45) Date of Patent: Mar. 30, 2021

(54) AUTOMOTIVE HEADREST

(71) Applicant: Suzhou Sonavox Electronics Co., Ltd.

(72) Inventors: Tingting Fu, Suzhou (CN); Xiaofeng Wu, Suzhou (CN); Xiaoqing Wang, Suzhou (CN); Yuezhen Li, Suzhou (CN); Guoqiang Chai, Suzhou (CN); Jianming Zhou, Suzhou (CN)

(73) Assignee: Suzhou Sonavox Electronics Co., Ltd., Suzhou (CN)

( * ) Notice: Subject to any disclaimer, the term of this patent is extended or adjusted under 35 U.S.C. 154(b) by 0 days.

(21) Appl. No.: 16/483,268

(22) PCT Filed: Sep. 13, 2018

(86) PCT No.: PCT/CN2018/105488
§ 371 (c)(1),
(2) Date: Aug. 2, 2019

(87) PCT Pub. No.: WO2019/085657
PCT Pub. Date: May 9, 2019

(65) Prior Publication Data
US 2020/0010002 A1   Jan. 9, 2020

(30) Foreign Application Priority Data

Nov. 3, 2017   (CN) .......................... 201721450022.3

(51) Int. Cl.
| | |
|---|---|
| *B60N 2/879* | (2018.01) |
| *H04R 1/02* | (2006.01) |
| *H04R 1/40* | (2006.01) |
| *H04R 3/12* | (2006.01) |

(52) U.S. Cl.
CPC ............. *B60N 2/879* (2018.02); *H04R 1/025* (2013.01); *H04R 1/403* (2013.01); *H04R 3/12* (2013.01); *H04R 2499/13* (2013.01)

(58) Field of Classification Search
CPC ..................................................... B60N 2/879
See application file for complete search history.

(56) References Cited

U.S. PATENT DOCUMENTS

| | | | | |
|---|---|---|---|---|
| 3,512,605 | A * | 5/1970 | McCorkle | H04R 5/023 |
| | | | | 381/301 |
| 5,436,977 | A * | 7/1995 | Sato | H04R 1/2826 |
| | | | | 181/156 |
| 9,826,295 | B2 * | 11/2017 | Fujita | H04R 1/2803 |
| 2007/0280499 | A1 * | 12/2007 | Foletta | H04R 1/2803 |
| | | | | 381/413 |
| 2017/0106775 | A1 * | 4/2017 | Takada | H04R 1/025 |

FOREIGN PATENT DOCUMENTS

WO   WO-2016129663 A1 *   8/2016   ............... B60N 2/80

* cited by examiner

*Primary Examiner* — Syed A Islam
(74) *Attorney, Agent, or Firm* — Peter L. Brewer; Thrive IP

(57) ABSTRACT

An improved automotive headrest and an automotive seat with the improved automotive headrest. The automotive headrest comprises a support and a headrest body disposed on the support, the headrest body has a first cavity and a second cavity independent of one another, and the first cavity and the second cavity are provided with a speaker unit respectively, and the two speaker units are located on the left and right sides of the headrest body respectively. The automobile headrest has a simple structure, a small size, and a good visual field.

10 Claims, 4 Drawing Sheets

AUTOMOTIVE HEADREST

STATEMENT OF RELATED APPLICATIONS

The present application is filed under 35 U.S.C. § 371, and claims priority to PCT/CN2018/105488 filed Sep. 13, 2018. That application is entitled "Automotive Headrest and Automotive Seat."

The PCT application, in turn, claims priority from Chinese Patent Application No. CN201721450022.3 filed on Nov. 3, 2017. These applications are referred to and incorporated herein in their entireties by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD OF THE INVENTION

The present disclosure relates to the field of automotive spare parts. More particularly, the present disclosure relates to an automotive headrest and to an automotive seat that supports the headrest.

BACKGROUND OF THE INVENTION

The existing automotive seat mainly includes a backrest and a headrest, with the headrest being mounted on the automotive seat. At present, most of the traditional automotive seats do not have a sounding unit, or speaker. When the occupant wishes to listen to music or answer the phone, it is generally realized by car audio. However, this way has the problem of poor privacy.

Aiming at this problem, Chinese Patent CN206141387U provides an automotive electronic headrest comprising a headrest frame, a main headrest and two side headrests, the headrest frame comprising a main support and two side extension supports connected to opposite sides of the main support, the main headrest being sheathed on the main support, and the two side head headrests being respectively sheathed on the corresponding side extension supports. Each of the side headrests is provided with at least one audio assembly and at least one microphone assembly. Although the automotive electronic headrest provided by this Chinese patent solves the above problems to some extent, it has two side headrests, which results in a large overall volume of the headrest, which wastes cost and affects the appearance. Further, the design affects visual field on the left and right sides.

SUMMARY OF THE INVENTION

Aiming at the above mentioned problems, the present disclosure is intended to provide an improved automotive headrest and an automotive seat with this improved automotive headrest, which has improved privacy, a simple structure, a small size, and a good visual field.

According to one aspect of the present disclosure, an automotive headrest is provided, comprising a support and a headrest body disposed on the support, wherein the headrest body has a first cavity and a second cavity independent of another. The first cavity and the second cavity are provided with a speaker unit, respectively, with the two speaker units being located on the left and right sides of the headrest body, respectively.

The headrest body comprises a front cover board, with a left side portion of the front cover board having a left mounting portion, and with a right side portion of the front cover board having a right mounting portion. Each of the speaker units comprises a speaker, and the left mounting portion is provided with a left mounting hole communicating with the first cavity, the right mounting portion is provided with a right mounting hole communicating with the second cavity. The speaker on the left side is mounted in the left mounting hole, while the speaker on the right side is mounted in the right mounting hole.

The left mounting portion is further provided with a left echo tube, which extends through the left mounting portion and extends rearward to communicate with the first cavity. At the same time, the right mounting portion is further provided with a right echo tube, which extends through the right mounting portion and extends rearward to communicate with the second cavity.

Each of the speaker units further comprises a mesh cover, a sound gathering cover and a speaker cover board sequentially provided on a front surface of the speaker. The mesh cover is covered on the front surface of the speaker. Positions on the sound gathering cover and the speaker cover board corresponding to the mesh cover are respectively provided with through holes for sound propagation.

Further, a center line of the through hole of the speaker unit on the left side and a center line of the through hole of the speaker unit on the right side forms an angle greater than 0 and less than 180 degrees relative to a direction of travel of the automobile. Preferably, each of the angles is 45 degrees relative to the direction of travel.

Further, the speaker unit on the left side and the speaker unit on the right side are symmetrical.

Further, the shapes of a left portion and a right portion of the front cover board are adapted to a left rear side and a right rear side of a head of an occupant respectively.

The left portion of the front cover board gradually extends forward from a middle part of the front cover board to a left edge thereof, while the right portion of the front cover board gradually extends forward from a middle part of the front cover board to a right edge thereof.

In one aspect, the first cavity and the second cavity are filled with a sound absorbing material (such as sound-absorbing cotton).

According to another aspect of the present disclosure, an automotive seat is provided comprising a backrest, and further comprises the above mentioned automotive headrest, with the automotive headrest being disposed on an upper portion of the backrest.

Due to the use of the above technical solutions, the present invention has the following advantages over the prior art:

BRIEF DESCRIPTION OF THE DRAWINGS

For explaining the technical solutions of the present disclosure more clearly, the accompanying drawings used to describe the embodiments are introduced in the following drawings. The below described drawings merely show a part of the embodiments of the present disclosure, and those skilled in the art can obtain other drawings according to the accompanying drawings without creative work.

In the above drawings.

100—headrest body; 200—support; 101—rear cover board; 102—front cover board; 103—left partition board; 104—right partition board; 105—left cover board; 106—right cover board; 107—left mesh cover; 108—right mesh cover; 109—left sound gathering cover; 110—right sound gathering cover; 111—left speaker cover board; 112—right speaker cover board; 113—left seal gasket; 114—right seal gasket; 115—left speaker; 116—right speaker; 117—left mounting portion; 117a—left mounting hole; 118—right mounting portion; 118a—right mounting hole; 119—left echo tube; 120—right echo tube; 121—through hole.

DETAILED DESCRIPTION OF CERTAIN EMBODIMENTS

In the following, the preferable embodiments of the present disclosure are explained in detail combining with the accompanying drawings so that the advantages and features of the present disclosure can be understood by one of ordinary skill in the art. It is should be noted that the explanation on these implementations is to help with an understanding of the present disclosure, and is not intended to limit the present disclosure. Further, the technical features involved in the various embodiments of the present disclosure described below may be combined with each other as long as they do not conflict with each other.

Figure 1:
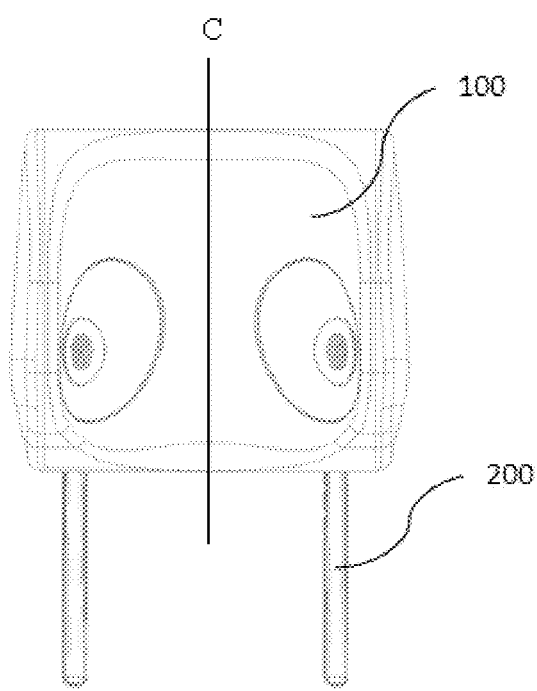
FIG. 1 is a front view of an automotive headrest according to the present disclosure, in one embodiment.

The orientation words mentioned in the present disclosure are defined by the conventional viewing angle of the headrest. For example, "left" and "right" correspond to the left side and the right side of the paper surface in FIG. 1, respectively, and "front" and "rear" are defined according to the traveling direction of an automobile.

Figure 2:
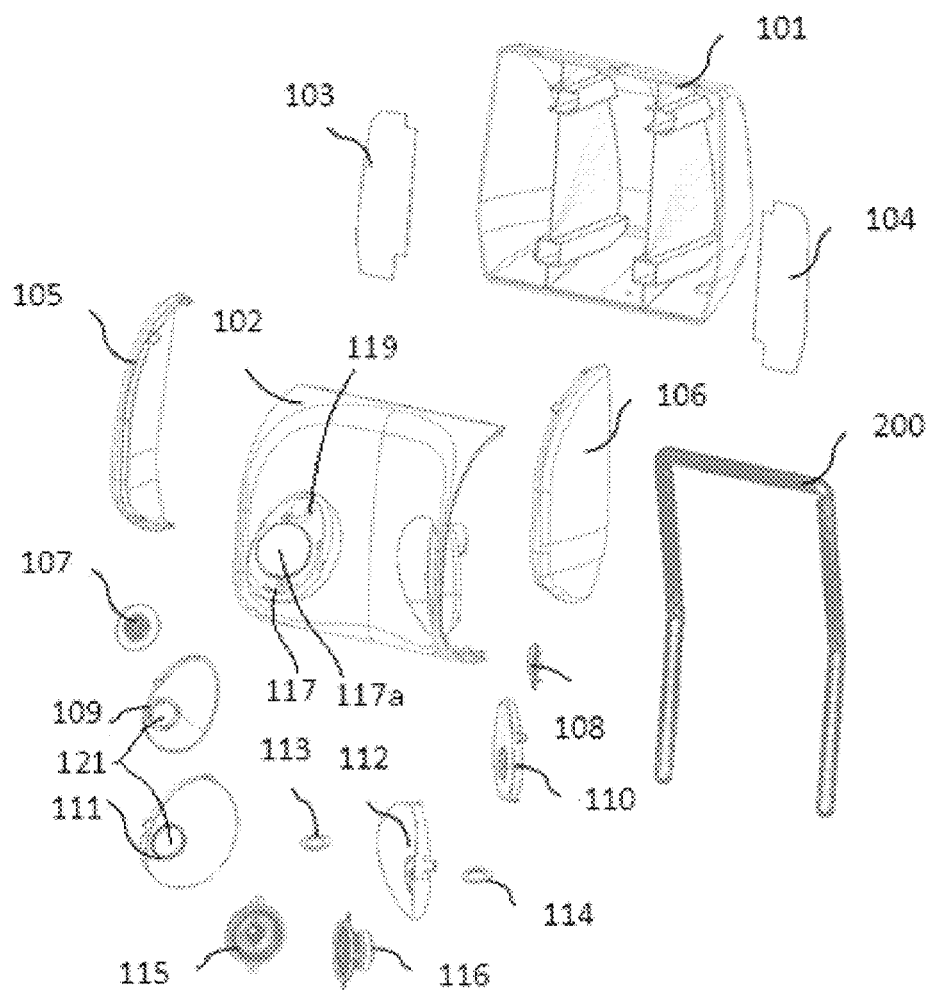
FIG. 2 is an exploded view of the automotive headrest of FIG. 1.

The present embodiment provides an automotive seat comprising a backrest and an automotive headrest disposed on an upper portion of the backrest. Referring to FIGS. 1-5 together, the automotive headrest comprises a support 200 and a headrest body 100 disposed on the support 200, with a lower portion of the support 200 being fixedly connected to the backrest, and with an upper portion of the support 200 being fixedly connected to the headrest body 100. Specifically as shown in FIG. 2, the support 200 is a rod of an inverted U shape, an upper end portion of the support 200 is located within the headrest body 100, and two end portions of the support 200 extend out from a lower portion of the headrest body 100, and the left and right lower end portions of the support 200 and the headrest body 100 are seal fitted via a left seal gasket 113 and a right seal gasket 114, respectively.

Figure 3:
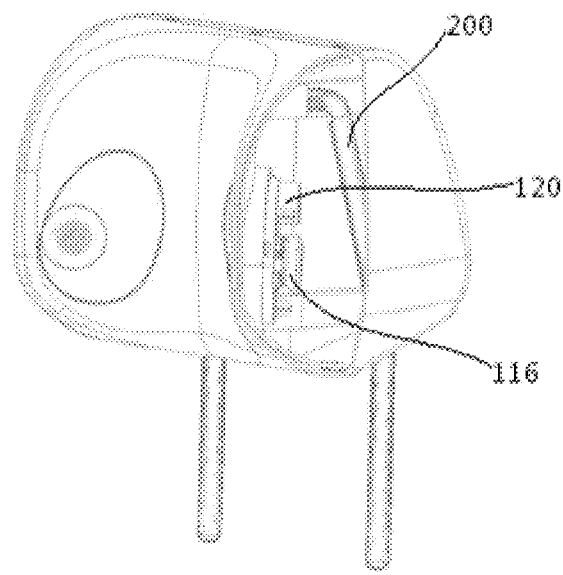
FIG. 3 is a partial sectional view of the automotive headrest of FIG. 1.

The headrest body 100 is provided with a first cavity and a second cavity, which are mutually independent of one another. The first cavity and the second cavity are each provided with a speaker unit, wherein the two speaker units are located on left and right sides of the headrest body 100, respectively. The speaker unit 115 on the left side and the speaker unit 116 on the right side are bilaterally symmetrical with respect to a center line of the headrest body 100 in an up-down direction (shown by a straight line C in FIG. 1). Due to that the first cavity and the second cavity are mutually independent, the two are not communicated with each other, and prevent the sound of the speaker units 115, 116 provided in the two cavities from rewinding, as shown in FIG. 3. In addition to the first cavity and the second cavity, the headrest body 100 also has other cavities therein, and all cavities including the first cavity and the second cavity are filled with sound absorbing materials such as sound-absorbing cotton, thereby reducing the sound pressure level of the two sides and the back.

A structure of the headrest body 100 and the speaker units 115, 116 is specifically as shown in FIG. 2. The headrest body 100 comprises a rear cover board 101 and a front cover board 102 that are connected with each other, and a left cover board 105 and a right cover board 106 for closing the rear cover board 101 and the front cover board 102. A left partition board 103 is disposed between the left side portions of the rear cover board 101 and the front cover board 102 to form the independent first cavity between the front cover board 102, the left cover board 105 and the left partition board 103; a right partition board 104 is disposed between the right side portions of the rear cover board 101 and the front cover board 102 to form the independent second cavity between the front cover board 102, the right cover board 106 and the right partition board 104; the front and rear cavities are partitioned by the left partition board 103 and the right partition board 104 to further reduce the sound pressure level of the back.

The shapes of the left portion and the right portion of the front cover board 102 are adapted to a left rear side and a right rear side of the head of an occupant, respectively. Each of the left and right portions of the front cover board 102 is arcuate-shaped, so that the left portion of the front cover board 102 gradually extends forward from a middle part of the front cover board 102 to a left edge thereof, and the right portion of the front cover board 102 gradually extends forward from a middle part of the front cover board 102 to a right edge thereof. In this way, the left and right edges of the front cover board 102 are slightly convex forward, and can block the sound of the speaker from propagating to the outside, and are more comfortable without blocking the viewing field at the same time.

The left side portion and the right side portion of the front cover board 102 have a left mounting portion 117 and a right mounting portion 118, respectively Each of the speaker units comprises a speaker 115 or 116. The left mounting portion 117 is provided with a mounting hole 117a communicating with the first cavity, while the right mounting portion 118 is provided with a right mounting hole 118a communicating with the second cavity. The left speaker 115 is mounted within the left mounting hole 117a, while the right speaker 116 is mounted within the right mounting hole 118a.

Figure 4:
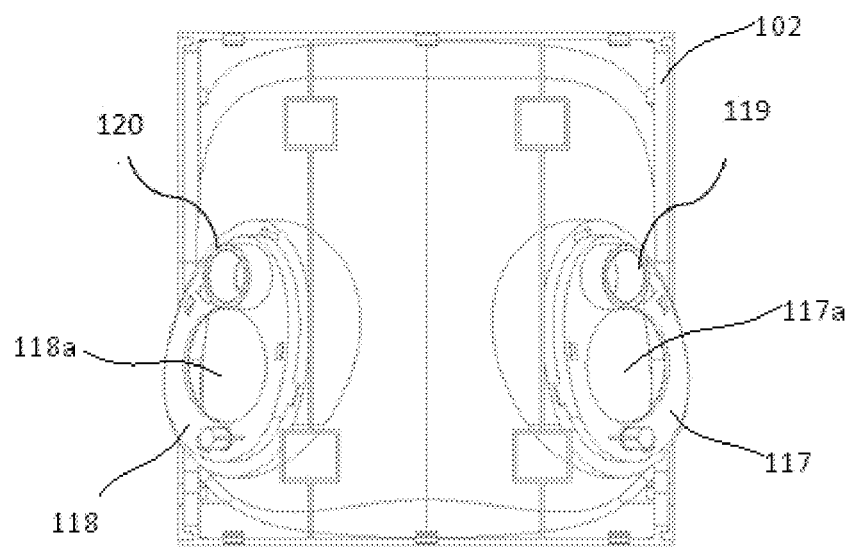
FIG. 4 is a rear view of a front cover board and speaker units according to the present disclosure.

As shown in FIGS. 2-4, the left mounting portion 117 is further provided with a left echo tube 119, which passes through the left mounting portion 117 and extends rearwardly to communicate with the first cavity. Similarly, the right mounting portion 118 is further provided with a right echo tube 120, which passes through the right mounting portion 118 and extends rearwardly to communicate with the second cavity. Through the echo tubes 119 and 120, the reverse sound waves can be suppressed, and the sound pressure levels of the rear walls of the first cavity and the second cavity can be controlled.

As shown in FIG. 2, the left speaker unit 115 further comprises a left mesh cover 107, a left sound gathering cover 109 and a left speaker cover board 111 sequentially provided on a front surface of the left speaker 115; the right speaker unit 116 further comprises a right mesh cover 108, a right sound gathering cover 110 and a right speaker cover board 112 sequentially provided on a front surface of the right speaker 116. The mesh covers 107, 108 are covered on the front surfaces of the speakers 115, 116, positions on the sound gathering covers 109, 110 and the speaker cover boards 111, 112 corresponding to the mesh covers 107, 108 are provided with through holes 121 for sound propagation, respectively.

Figure 5:
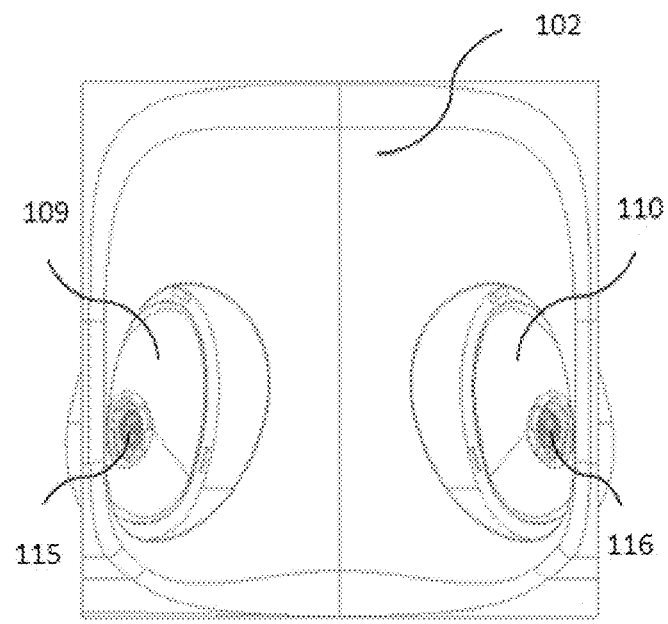
FIG. 5 is a view of the front cover board, the speaker units and the sound gathering cover according to the present disclosure.

As shown in FIG. 5, the sound gathering covers 109, 110 form a sound gathering structure, so that the sound emitted by the left speaker 115 and the right speaker 116 is more directional. A center line of the through hole 121 of the left speaker unit 115 and a center line of the through hole 121 of the right speaker unit 116 forms an angle greater than 0 degrees and less than 180 degrees relative to a traveling direction of an automobile Preferably, each of the angles on the two sides is 45 degrees. That is, the pointing angles of the speakers are positioned at 45 degrees. According to the suitable range of different kinds of human ear, the measurements are averaged.

In addition, the automotive headrest provided by the present embodiment has no DSP (digital signal processing) algorithm, and physical decompression and the control of the sound pressure level are achieved only through the design of the structure, thereby canceling out the sound and reducing the cost. The left speaker 115 and the right speaker 116 are positioned as close as possible to the ear, and can also be assisted by other devices that gather sound close to the ear, such as sleeving a headset soft cover over the speakers 115, 116.

It should also be noted that the connections between the components of the headrest body 100, between the components of the speakers 115, 116, and between the headrest components and the speaker components employ detachable connections via hook components, and also may utilize other connection manners such as glue fixing.

Figure 6:
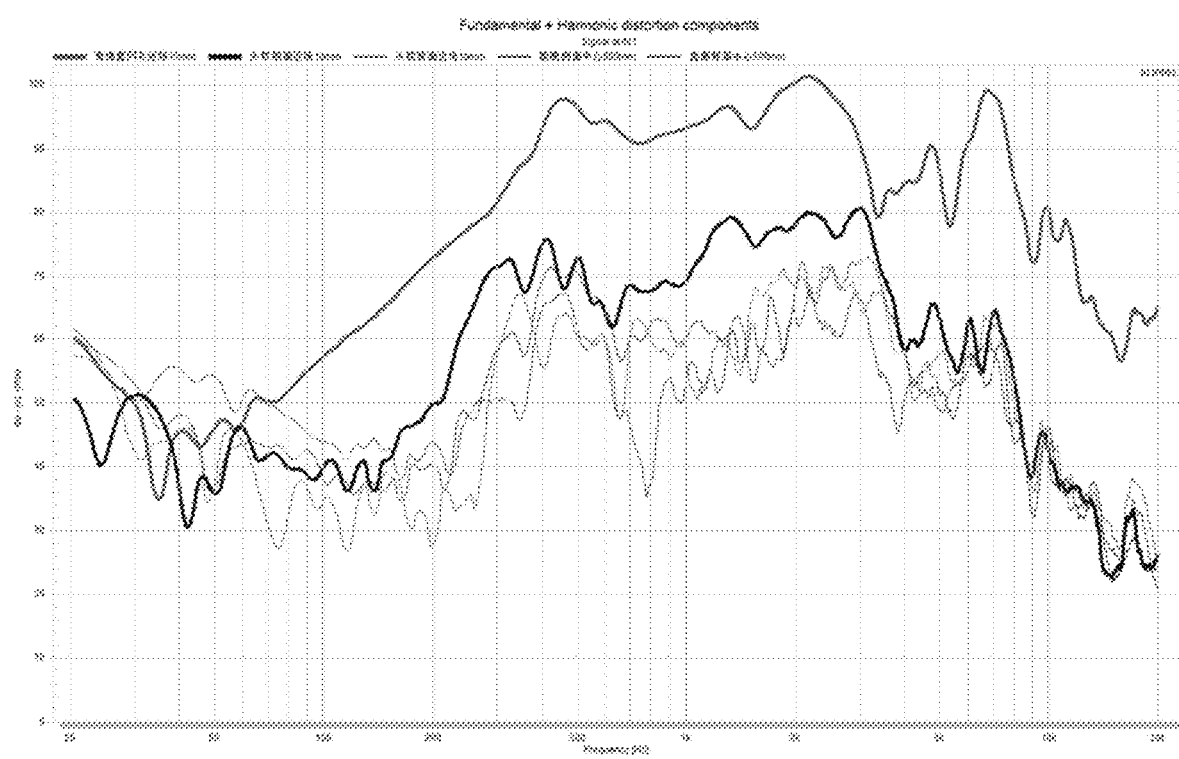
FIG. 6 is a test chart of the sound performance of the automotive headrest of FIG. 1.

The automotive headrest 100 provided by the present embodiment has the following advantages: the function of the private conversation can be realized only by the structural design, as shown in the performance test data in FIG. 6; the cost is low, the development of the DSP algorithm is not required, and the sound pressure is reduced only by the physical method, the shape is simple and comfortable, and the function can be realized by only one headrest, and the material cost is low.

The embodiments described above are only for illustrating the technical concepts and features of the present invention, are preferred embodiments, and are intended to make those skilled in the art able to understand the present invention and thereby implement it, and should not be concluded to limit the protective scope of this disclosure.

What is claimed is:

1. An automotive headrest, comprising:
   a support; and
   a headrest body disposed on the support;
   wherein:
   the headrest body has a first cavity and a second cavity independent of one another,
   each of the first cavity and the second cavity is provided with a speaker unit, and
   the two speaker units are located on left and right sides of the headrest body, respectively,
   further wherein:
   the headrest body further comprises a front cover board,
   a left side portion of the front cover board has a left mounting portion, while a right side portion of the front cover board has a right mounting portion,
   each of the speaker units comprises a speaker,
   the left mounting portion is provided with a left mounting hole communicating with the first cavity, while the right mounting portion is provided with a right mounting hole communicating with the second cavity,
   the speaker on the left side is mounted in the left mounting hole, while the speaker on the right side is mounted in the right mounting hole,
   the left mounting portion is further provided with a left echo tube, which extends through the left mounting portion and extends rearward to communicate with the first cavity, and
   the right mounting portion is further provided with a right echo tube, which extends through the right mounting portion and extends rearward to communicate with the second cavity.

2. The automotive headrest according to claim 1, wherein:
   each of the speaker units further comprises a mesh cover, a sound gathering cover and a speaker cover board sequentially provided on a front surface of the speaker,
   the mesh cover is covered on the front surface of the speaker, and
   positions on the sound gathering cover and the speaker cover board corresponding to the mesh cover are respectively provided with through holes for sound propagation.

3. The automotive headrest according to claim 2, wherein a center line of the through hole of the speaker unit on the left side and a center line of the through hole of the speaker unit on the right side each forms an angle greater than 0 degrees and less than 180 degrees relative to a traveling direction of an automobile, respectively.

4. The automotive headrest according to claim 3, wherein each of the angles is 45 degrees relative to the traveling direction of the automobile.

5. The automotive headrest according to claim 2, wherein the speaker unit on the left side and the speaker unit on the right side are symmetrical.

6. The automotive headrest according to claim 1, wherein the shapes of a left portion and a right portion of the front cover board are adapted to a left rear side and a right rear side of a head of an occupant, respectively.

7. The automotive headrest according to claim 6, wherein:
   the left portion of the front cover board gradually extends forward from a middle part of the front cover board to a left edge thereof, and
   the right portion of the front cover board gradually extends forward from a middle part of the front cover board to a right edge thereof.

8. The automotive headrest according to claim 1, wherein the first cavity and the second cavity are filled with a sound absorbing material.

9. The automotive headrest according to claim 8, wherein the sound absorbing material is cotton.

10. The automotive seat of claim 1, wherein the automotive headrest is disposed on an upper portion of a backrest.

* * * * *